United States Patent [19]
Kocian et al.

[11] Patent Number: 6,063,877
[45] Date of Patent: May 16, 2000

[54] CONTROL OF GAS PHASE POLYMERIZATION REACTIONS

[75] Inventors: Harvey Gene Kocian, Victoria, Tex.; David Merrill Rebhan, Alum Creek; John Roberts Parrish, Cross Lanes, both of W. Va.; Thomas Walter Pilgram, Port Lavaca, Tex.

[73] Assignee: Union Carbide Chemicals & Plastics Technology Corporation, Danbury, Conn.

[21] Appl. No.: 08/904,164

[22] Filed: Jul. 31, 1997

[51] Int. Cl.⁷ ........................................................ C08F 2/34
[52] U.S. Cl. .............................. 526/61; 526/68; 526/351; 526/352; 526/901
[58] Field of Search .............................. 526/61, 351, 352, 526/901, 68

[56] References Cited

U.S. PATENT DOCUMENTS

| | | | |
|---|---|---|---|
| 4,543,399 | 9/1985 | Jenkins, III et al. | 526/70 |
| 4,588,790 | 5/1986 | Jenkins, III et al. | 526/67 |
| 5,352,749 | 10/1994 | DeChellis et al. | 526/68 |
| 5,405,922 | 4/1995 | DeChellis et al. | 526/68 |
| 5,436,304 | 7/1995 | Griffin et al. | 526/68 |
| 5,453,471 | 9/1995 | Bernier et al. | 536/68 |
| 5,462,999 | 10/1995 | Griffin et al. | 526/68 |

*Primary Examiner*—David Buttner
*Attorney, Agent, or Firm*—P.A. Doody

[57] ABSTRACT

The present invention teaches a process for controlling a continuous gas phase (exothermic) process operating in condensing mode (e.g. polymerization) with a selected temperature for the reactor bed or outlet and with a temperature differential between the reactor inlet and the reactor bed or outlet by controlling the heat transfer provided by the heat exchanger in the recycle line to maintain the selected reactor bed temperature or outlet temperature while simultaneously controlling a condensable liquid feed rate to maintain the temperature differential.

10 Claims, 1 Drawing Sheet

CONTROL OF GAS PHASE POLYMERIZATION REACTIONS

BACKGROUND OF THE INVENTION

For exothermic reactions (e.g., polyethylene (PE) and polypropylene (PP) polymerization) in fluidized bed reactors many benefits are gained by maximizing cooling on both macroscopic and microscopic levels. Macroscopic in this case implies the total volume of the reactor whereas microscopic refers to the immediate vicinity around the catalytic sites where polymerization is taking place. When cooling improves, catalyst productivity and polymer properties often improve. At the same time, reactor operability becomes more robust since hot spotting, sheeting, and chunking are reduced.

One way of maximizing cooling throughout the reaction zone, and particularly on the microscopic level is by evaporative cooling. To this end, polymerization processes in which a certain portion of the cycle gas stream is condensed and fed to the reactor as a liquid where it vaporizes have been used (i.e., "condensing mode").

Condensing mode processes have been limited due to several factors including only an estimate of the amount of liquid entering the bed was controlled/monitored. Thus, depending on other process parameters, the instantaneous rate of liquid evaporation in the reaction zone was variable and was not controlled. The inability to independently control rate of liquid evaporation can cause oscillation/variation in reaction control variables like reactor pressure, temperature, bed weight, and fluidized bulk density. This in turn can cause variations in product properties and catalyst productivity. Additionally, the amount of liquid entering the bed has been estimated using the assumption of thermodynamic equilibrium. Thus, prior art methods have not been able to account for the dynamic nature of the fluidized bed reaction system.

SUMMARY OF THE INVENTION

The present invention encompasses a process for controlling a continuous exothermic gas phase process (e.g., polymerization) in a reactor having a reactor inlet, a reactor bed, a reactor outlet and a recycle line with a compressor and a heat exchanger with a selected temperature for the reactor bed or outlet and with a temperature differential between the reactor inlet and the reactor bed or outlet, wherein the reactor is operating in condensing mode by selecting a differential temperature ($\Delta T$) set point consistent with the level of liquid hold up and rate of evaporation desired, where $\Delta T = T_e - T_i$ or $T_b - T_i$ and $T_b$, $T_e$ and $T_i$ are the reactor bed, reactor exit and reactor inlet temperatures, respectively. Thus, $T_i$ is set by the desired $\Delta T$. Given this set of conditions, the heat transfer provided by the heat exchange should be controlled to maintain $T_b$ or $T_e$ while simultaneously controlling the feed flow rate to the reaction of a condensable fluid to maintain $\Delta T$.

DETAILED DESCRIPTION OF THE INVENTION

Reaction Process

Figure 1:
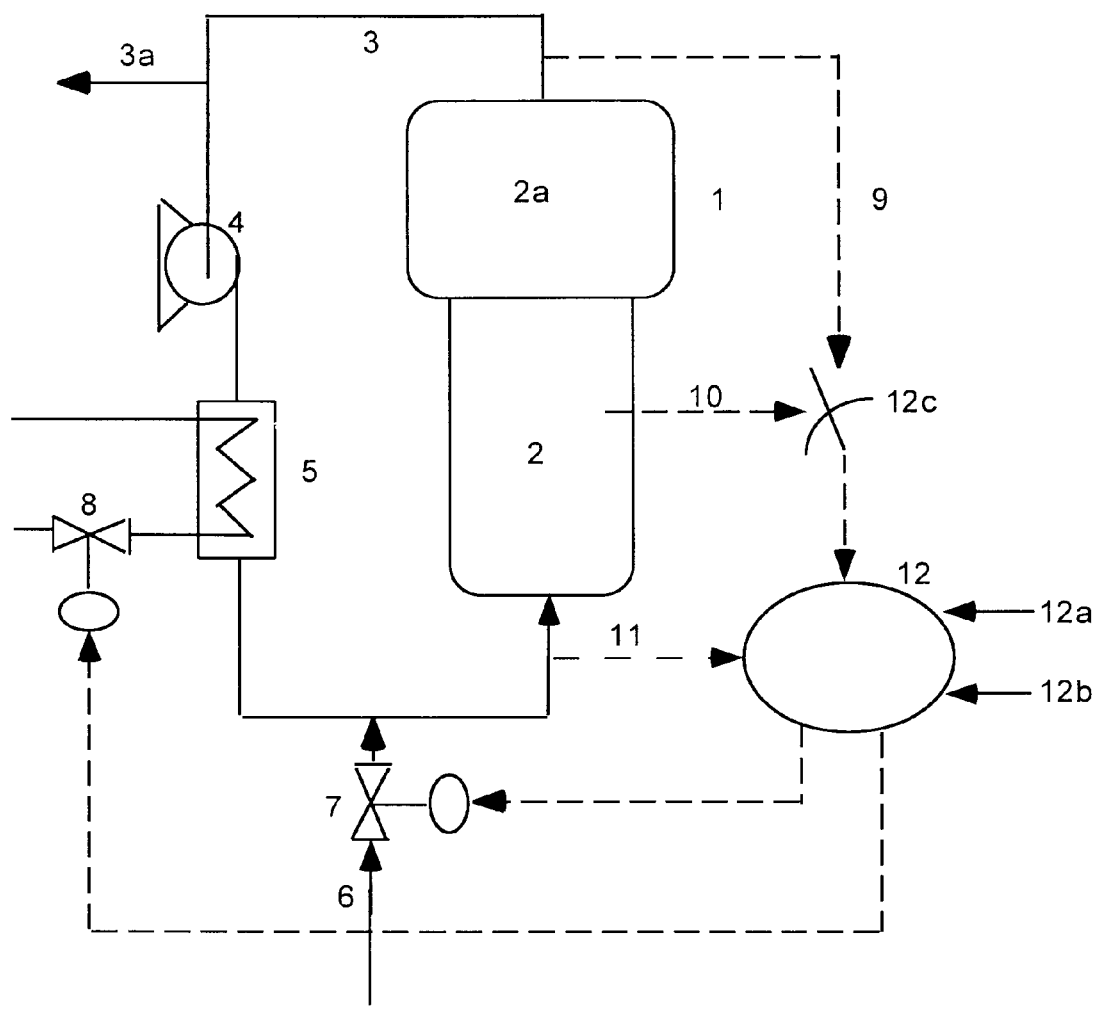
FIG. 1 is a schematic diagram of a polymerization process according to the present invention.

The present invention is not limited to any specific type of continuous gas phase exothermic reaction and can be carried out in a stirred or fluidized bed reactor, except that it should be conducted using condensing mode, including the so-called "induced condensed mode", and "liquid monomer" methods. For example, fluidized bed process for producing polymer resins are practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream. Condensed mode polymerizations are disclosed in U.S. Pat. Nos. 4,543,399; 4,588,790; 5,352,749; and 5,462,999.

In condensing mode processes this recycle stream, or a portion thereof, is cooled to a temperature below the dew point, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid(s) may be inert to the catalyst, reactants and the polymer product produced; or it may be the monomers and comonomers used in the polymerization. The condensable fluid can be introduced into the reaction/recycle system at any point in the system. Condensable fluids include saturated or unsaturated hydrocarbons. Examples of suitable condensable fluids may be selected from liquid saturated hydrocarbons containing 2 to 8 carbon atoms (e.g., propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof); and polymerizable condensable comonomers (e.g., olefins, alpha-olefins, diolefins, diolefins containing at least one alpha olefin, such as propylene, 1-butene, isobutene, hexene, hexadiene, isoprene, styrene, octadiene, ethylidene norborene, butadiene and mixtures thereof) may be used.

Liquid monomer polymerization mode may be employed, as is disclosed in U.S. Pat. No. 5,453,471, U.S. Ser. No. 510,375, PCT 95/09826 (U.S.) and PCT 95/09827 (U.S.). When operating in the liquid monomer mode, liquid can be present throughout the entire polymer bed provided that the liquid monomer present in the bed is adsorbed on or absorbed in solid particulate matter present in the bed, such as polymer being produced or fluidization aids (e.g., carbon black) present in the bed. The liquid monomer process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, preferably there also is present at least one inert gas.

Control Method

The control method of the present invention maintains a steady rate of liquid evaporation in the reaction zone while maintaining only a gas phase in the recycle line prior to the compression or cooling of the recycle gas. The difference between the reactor exit ($T_e$) or bed ($T_b$) temperature and reactor inlet ($T_i$) temperature, $\Delta T$, which is related to the amount of liquid evaporation occurring on a steady state basis in the reaction zone, can be used to control the liquid evaporation. This can be achieved because the evaporation process takes place at a relatively constant temperature.

For the case of no evaporation (no liquid inventory), $\Delta T$ is at a maximum for a given production rate since the heat generated by reaction is transferred to the recycle gas stream as sensible heat. As liquid inventory increases, a portion of the heat generated by reaction is used for the evaporation process. Thus, as the amount of liquid evaporation increases (and the amount of liquid entering the bed increases), $\Delta T$ becomes smaller. By controlling $\Delta T$, one can control evenly the rate of liquid evaporation in the reaction zone (i.e., the instantaneous liquid inventory in the reaction zone). Thus, sensitive control of the amount of liquid evaporation occurring in the reaction zone can be accomplished based solely upon two temperature measurements.

With the present control method the reactor temperature gradient becomes more stable on a macroscopic level and more uniform on a microscopic level. Hot spots, wall effects, and catalyst site overheating are minimized. Additionally, pressure, temperature, and gas chromatograph analysis do not swing due to uncontrolled evaporation/condensation of cycle gas. The reactor bed weight and fluidized bulk density do not swing due to changing levels of liquid inventory in the bed. Product consistency and reproducibility improves due to more stable control of operating parameters. The production rate is stabilized due to the stabilization of the variables listed above, which in turn allows for increasing of average reactor rates. Generally, catalyst productivity will increase as liquid inventory increases, which will reduce catalyst costs and product ash content.

The present method is different from other control methods in that the extent of vaporization in the reaction zone is inferred by production rate and a temperature difference, rather than a less reliable and more complex estimate of condensation at the reactor inlet. This provides a "direct measure" of evaporative cooling in the reaction zone.

$T_i$ may be measured at the bottom of the reactor or along the recycle line, after the heat exchanger and compressor and preferably after the feed line(s). If the $T_i$ is measured in the recycle line before the feed line(s), then adjustment should be made to compensate for any heating or cooling of the recycle stream by the feed material. $T_e$ may be measured in the reactor above the fluidization zone of the reactor bed, at the reactor outlet or in the recycle line before the compressor and/or heat exchanger. $T_b$ may be measured in the fluidized bed, preferably in the top half of the bed. It is preferred to make the measurement above the maximum height of liquid penetration.

Selecting reactor pressure and composition to ensure condensing mode depends on the reactor design and the particular reaction, as well as desired production rate and product requirements. Such selections and determinations are well within the abilities of one of ordinary skill in the art. Certain considerations in such selection will be clear from the other requirements of this system set forth below.

In one embodiment of the present invention with reference to FIG. 1, there is a reactor 1, with a reaction zone 2 and disentrainment zone 2a, a recycle line 3, which has a vent line 3a, and which passes through a compressor 4 and a heat exchanger 5 before re-entering the reactor. Though re-entry is shown at the bottom of the reactor, such re-entry may be at other locations in the reactor and may be split into several feed lines. There is a condensable fluid agent feed line to the recycle line 6 with control valve 7. There is a coolant control valve 8 for the heat exchanger 5. There are three thermocouples 9, 10, 11 which measure $T_e$, $T_b$, and $T_i$, respectively. Bed temperature and differential temperature $\Delta T$ are maintained simultaneously via controller 12. There are inputs for bed temperature set point 12a and $\Delta T$ set point 12b, as well as a temperature measurement switch 12c which can be switched between measuring $T_e$ and $T_b$. Controller 12 manipulates valve 8 to control $T_b$ or $T_e$ and and also valve 7 to control $\Delta T$.

Product may be withdrawn from the reactor (2, 2a) while reactants may be fed with the condensable fluid, or separately into the reactor or recycle line.

The measured $\Delta T$ is related to reactor control parameters for steady state operation as follows:

$$\Delta T = \frac{(P.R.)(\Delta H_r) - (\dot{m})(x_1)(\Delta H_v)}{(\dot{m})(1 - x_1)(C_p)_{cyclegas}}$$

where (P.R.)=production rate, ($\Delta H_r$)=heat of reaction, ($\dot{m}$)=cycle gas stream mass flow rate, ($x_l$)=mass fraction of liquid in the cycle gas stream at reactor inlet, ($\Delta H_v$)=heat of vaporization, and $(C_p)_{cyclegas}$=heat capacity of the cycle gas.

$\Delta H_r$, $C_{p_{cyclegas}}$, and $\Delta H_v$ are constants; P.R. is set by catalyst and reactant flow rates; $\dot{m}$ is a function of pressure, cycle gas composition, and compressor operation; and $x_l$ is a function of the liquid monomer feed rate and liquid from the heat exchanger. Thus, several parameters must be controlled to maintain a constant $\Delta T$.

The preferred way to control $\Delta T$ is to vary the condensable fluid agent feed rate or composition while maintaining the other variables constant. This is preferred because:

1) P.R. usually is determined by commercial necessity and so typically only is varied as needed to maximize production rates.
2) Cycle gas flow rate ($\dot{m}$) may be varied to affect control; but generally is not acceptable for fine control, as cycle gas flow rate affects other critical variables such as fluidization quality.
3) The heat exchanger typically is operated to control constant $T_b$ or $T_e$, not $\Delta T$. Also, liquid condensation in the heat exchanger is a function of several reaction parameters and is not controllable independently.

The present process has certain stability and operational limits, which are both steady state and dynamic. Three specific limits are 1) The total heat generated by reaction must be greater than or equal to the total heat required for liquid vaporization. For steady state operation, $(P.R.)(\Delta H_v) \geq (\dot{m})(x_l)(\Delta H_v)$; and in dynamic operation, $$\int_0^\tau [(P.R.)(\Delta H_r)]dt \geq \int_0^\tau [\dot{m}(x_1)(\Delta H_v)]dt$$

where t is a characteristic time scale of the reaction system. This limit stipulates that stable, steady operation only can be maintained when the total heat generated by reaction is sufficient to vaporize all the liquid entering the reaction zone for a characteristic time. If the heat generated by reaction is less than the heat required to evaporate the incoming liquid, then liquid inventory will increase and flooding may occur, resulting in poor fluidization, mixing, or similar problems. Hence, this limit defines the upper limit for inlet liquid flow during steady state operation. When the heat generated by reaction equals the heat required for liquid vaporization, then $\Delta T$ is at its minimum. For a single component $\Delta T=0$ at this condition. For multicomponent mixtures $\Delta T$ can be different from zero due to changing composition of the liquid and vapor phases during the evaporation process.

2) $\Delta T$ must be less than or equal to the temperature difference which would exist for no liquid evaporation (i.e., all sensible heat), i.e., $$\Delta T \leq \frac{(P.R.)(\Delta H_r)}{(\dot{m})(C_p)_{cyclegas}}$$

Note that this equation assumes there is no liquid in the cycle gas stream prior to the compressor and the heat capacity of the cycle gas is calculated at reaction temperature and pressure. The upper control limit for $\Delta T$ is defined when it equals the value defined by the above ratio.

3) The process needs to display a degree of predictable behaviour for appropriate application of the invention. Specifically, an increase in the liquid fraction of the entering stream should result in either constant or increased production rate, with other independent variables (catalyst feed, reactor temperature, etc.) held constant. This condition can be expressed mathematically as follows, $$\frac{\partial (P.R.)}{\partial [\dot{m}(x_1)]}\bigg|_{\substack{\text{Catalyst Feed,}\\ \text{Other Independant}\\ \text{Variables Constant}}} \geq 0$$

This requirement is related to the process itself. The operating restriction involved requires that an increase in the liquid fraction entering the reactor does not itself cause reduction in production rate at steady state. Variations in catalyst productivity or feed rate do not necessarily limit applicability of the invention, unless such variables are correlated with the liquid fraction variations at steady state.

The temperature of the reactor inlet stream ($T_i$) can be operated in a range slightly larger than that defined by the bubble point and dew point temperatures of the cycle gas stream. This ensures that liquid is entrained into the reaction zone and also accounts for some deviation from thermodynamic equilibrium (i.e., dynamic behavior). Liquid is formed both by condensation in the cycle gas heat exchangers and by make-up of fresh condensable fluid through the feed line 6. The minimum $\Delta T$ is defined by 'operating limit #1' above. This gives the maximum ($x_i$) for the pressure/composition of the cycle gas stream at the reactor inlet. The maximum $\Delta T$ for control is defined by 'operating limit #2' above, $x_i=0$. Operation with $\Delta T$'s between this range will result in a range of liquid evaporation rates with 0–100% of the heat of reaction being removed by liquid evaporation.

Optimum $\Delta T$'s for control purposes are a function of many variables including superficial gas velocity, total cycle gas flow, cycle gas density, cycle gas heat capacity, cycle gas heat exchanger size and efficiency, cycle gas composition, and fluidization parameters such as resin morphology, fluidized bed density bed weight, solubility of liquid phase in polymer, etc. Since, in most instances, it is desired to maintain a constant average $T_b$, the composition, $T_i$, and pressure of the cycle gas inlet stream may be chosen to give a desired ($x_i$) for a given average reactor $T_b$.

The amount of liquid entering the reaction zone is determined by the rate of condensation in the heat exchanger and the amount of liquid added as fresh feed. For example, in the manufacture of polypropylene, $\Delta T$ is controlled by make-up of fresh liquid propylene such that propylene feed is increased to reduce $\Delta T$ or decreased to increase $\Delta T$. For polyethylene production, a similar strategy can be used whereby the flow of a condensing agent, e.g., hexane, is varied to maintain a constant $\Delta T$. For systems which use an inert condensable fluid, a vent stream must also be available to remove the inert condensable fluid when needed (e.g., production rate slow-down, idling, shutdown, etc.)

The temperature in the lower region of the reactor bed where some liquid is present essentially remains at $T_i$. In the upper region of the reactor bed, where no condensate is present, a temperature gradient exists which increases in the direction of cycle gas flow. Thus, when the $\Delta T$ across the reactor is decreased, liquid penetration into the resin bed is increased.

Depending on the concentration and physical properties of the condensing agent used, various dew point temperatures can be achieved which best suit polymer production. For polypropylene production, propylene can be used. For polyethylene production numerous inert hydrocarbons can be used, including propane, butane, isopentane, pentane, hexane, etc. By changing the concentration and/or composition of the inert hydrocarbon(s), cycle gas stream compositions can be specified which result in condensing mode operation over a wide range of specified average bed temperatures. Thus, the control of reaction zone liquid evaporation rate can be extended over a broad range of desired operating temperatures. These principles can be used to stably control reaction zone liquid evaporation for any exothermic fluidized bed reaction.

The $\Delta T$ and $T_b$ or $T_c$ control function (12) can be accomplished using a variety of methods. The controller manipulates the influx of feed, especially the condensable fluid, to control the $\Delta T$, while also controlling the coolant flow in the heat exchange systems to maintain $T_b$ and $T_c$. Algorithms for such control are known to those of skill in the art and the specific heat and/or mass balances depend on the particular system. In open-loop stable systems, model based methods such as Dynamic Matrix Control or Internal Model Control techniques can be readily applied by those skilled in the art. In open loop unstable systems, control can be accomplished using analog-type (e.g., PID) functions or other more sophisticated model based techniques. In a polyethylene application, the control function manipulates the cycle gas heat exchanger cooling water system and a condensable fluid feed. In a polypropylene system, the function manipulates the cycle gas heat exchanger cooling water system and the condensable reactant feed (i.e., propylene). Many other alternatives for accomplishing the $\Delta T$ and $T_b$ or $T_c$ control are usable, as long as the principles of operation (1-3) are maintained.

Polymers

Illustrative of the polymers which can be produced in accordance with the invention are the following: ethylene homopolymers and ethylene copolymers employing one or more $C_3$–$C_{12}$ alpha olefins; propylene homopolymers and propylene copolymers employing one or more $C_4$–$C_{12}$ alpha olefins; two reactor polymers, including impact polypropylene copolymers; polyisoprene; polystyrene; polybutadiene; polymers of butadiene copolymerized with styrene; polymers of butadiene copolymerized with acrylonitrile; polymers of isobutylene copolymerized with isoprene; ethylene propylene rubbers and ethylene propylene diene rubbers; polychloroprene, and the like.

Catalysts

Catalysts as are known in the art may be used, including, but not limited to, Ziegler-Natta, single site, and metallocene types, as disclosed in U.S. Pat. Nos. 4,393,182, 5,106,806, 5,455,366, 5,329,033, 5,145,819 and 5,317,036, U.S. patent application Ser. No. 08/659,764 filed on Jun. 6, 1996, now U.S. Pat. No. 5,693,727 and PCT Application No. WO96/23010, which are incorporated herein by reference.

Example 1

Polyethylene Production

Thermodynamic models were used to simulate the relative amounts of liquid and gas phases and thermodynamic properties of the phases as a function of temperature, given a constant overall composition and pressure and assuming equilibrium. Then, a set of reaction conditions were picked to simulate real plant operation. Using the data, the "$\Delta T$ across the reaction zone" and "% Reaction Heat Removed by Vaporization" were calculated. Also, the limits of the method were calculated, $\Delta T$ with no liquid evaporation and the wt. % liquid corresponding to 100% reaction heat removed by evaporation ($\Delta T=0$ was assumed for this case to simplify the calculation.). The example shows how $\Delta T$ across the reaction zone can be used to control liquid evaporation in the reaction zone.

Overall Pressure: 295 psi

Overall Reactor Composition (mol %): $C_2H_4$=0.333, isopentane=0.093, $C_6H_{12}$=0.047, $C_6H_{14}$=0.009, $H_2$=0.06, $N_2$=0.458.

Calculated Dew Point=75.7° C.

Heat of Polymerization=1600 BTU/lb

Production Rate=56,600 lb/hr

Cycle Stream Mass Flow Rate=2,410,000 lb/hr.

Average Gas Heat Capacity over 30–80° C.≅0.78 BTU/lb-°C.

Average Liquid Heat of Vaporization over 30–80° C.≅80.9 BTU/lb.

$\Delta T_{max}$. Across Reaction Zone (i.e., no evaporation)≅48.2° C.

Maximum Wt. % Liquid at Reactor Inlet (i.e., 100% Reaction Heat Removed by Vaporization)=46.4

Overall Pressure: 295 psi

Overall Reactor Composition (mol fraction): $C_2H_4$=0.333, isopentane=0.04–0.1, $C_6H_{12}$=0.047, $C_6H_{14}$=0.009, $H_2$=0.06, $N_2$=0.511–0.451.

Heat of Polymerization=1600 BTU/lb

Production Rate=56,600 lb/hr

Cycle Stream Mass Flow Rate=2,410,000 lb/hr.

Average Gas Heat Capacity (from example 1)=0.78 BTU/lb-°C.

Average Liquid Heat of Vaporization (from example 1)=80.9 BTU/lb.

$\Delta T_{max}$. Across Reaction Zone (i.e., no evaporation)≅48.2° C.

Maximum Wt. % Liquid at Reactor Inlet (i.e., 100% Reaction Heat Removed by Vaporization)=46.4

| Inlet Temp. (° C.) | 30 | 40 | 50 | 55 | 60 | 65 | 70 | 75 | 80 | 85 |
|---|---|---|---|---|---|---|---|---|---|---|
| Wt. % Liquid | 27.1 | 23.2 | 18.3 | 15.5 | 12.3 | 8.8 | 5.0 | 0.7 | 0.0 | 0.0 |
| Enthalpy of Gas (BTU/lb-mol) | 3906 | 4149 | 4391 | 4513 | 4634 | 4756 | 4877 | 5000 | 5122 | 5245 |
| Enthalpy of Liquid (BTU/lb-mol) | −3272 | −2500 | −1726 | −1338 | −949 | −558 | −165 | 231 | 658 | 1093 |
| Gas Heat Capacity (BTU/lb-° C.) | 0.86 | 0.83 | 0.81 | 0.79 | 0.78 | 0.75 | 0.75 | 0.73 | 0.73 | |
| Liquid Heat of Vaporization (BTU/lb) | 103.3 | 94.2 | 85.6 | 81.3 | 76.9 | 72.7 | 68.5 | 64.4 | | |
| Ave. MW of Gas | 28.3 | 29.2 | 30.1 | 30.7 | 31.4 | 32.1 | 32.8 | 33.6 | 33.7 | 33.7 |
| Ave. MW of Liquid | 69.5 | 70.6 | 71.5 | 72 | 72.6 | 73.1 | 73.6 | 74.1 | | |
| $\Delta T$ across reaction zone (° C.) | 27.5 | 31.4 | 35.7 | 38 | 40.4 | 42.8 | 45.3 | 47.8 | 48.2 | 48.2 |
| % Reaction Heat Removed by Evaporation | 58.3 | 49.9 | 39.4 | 33.4 | 26.5 | 18.9 | 10.8 | 1.5 | 0.0 | 0.0 |

Example 2

Polyethylene Production; Effect of Composition

Example 2 is a similar to example 1, but details the effect of changing isopentane and nitrogen mol fraction at constant temperature. The simulation shows how liquid addition and deletion to the cycle flow can be used to control $\Delta T$ across the reaction zone (i.e., % Reaction Heat Removed by Vaporization) at constant reactor inlet temperature.

| Isopentane Mole Fraction | 0.04 | 0.05 | 0.06 | 0.07 | 0.08 | 0.09 | 0.1 |
|---|---|---|---|---|---|---|---|
| $N_2$ Mole Fraction | 0.511 | 0.501 | 0.491 | 0.481 | 0.471 | 0.461 | 0.451 |
| Inlet Temp. (° C.) | 50 | 50 | 50 | 50 | 50 | 50 | 50 |
| Dew Point (° C.) | 67.6 | 69.2 | 70.7 | 72.3 | 73.8 | 75.5 | 76.7 |
| Wt. % Liquid | 10.2 | 11.2 | 13.1 | 14.6 | 16.2 | 18.1 | 19.5 |
| $\Delta T$ across reaction zone (° C.) | 41.9 | 41.2 | 39.8 | 38.7 | 37.4 | 35.9 | 34.7 |
| % Reaction Heat Removed by Evaporation | 22 | 24.1 | 28.2 | 31.4 | 34.9 | 39 | 42 |

Example 3

Actual Polyethylene Production with Condensing/Evaporation

Example 3 shows actual polyethylene production data in condensing mode operation. This example shows that "real-life" data meets the criteria specified by the invention. The Average Gas Heat Capacity≅1.07 BTU/lb-°C.
Average Liquid Heat of Vaporization≅102 BTU/lb.
$\Delta T_{max}$. Across Reaction Zone (i.e., no evaporation)≅9.9° C.
Maximum Wt. % Liquid at Reactor Inlet (i.e., 100% Reaction Heat Removed by Vaporization)=10.4

| Inlet Temp. (° C.) | 58 | 58.5 | 58.8 | 59 | 59.5 | 59.7 | 60 |
|---|---|---|---|---|---|---|---|
| Wt. % Liquid | 15.4 | 14.3 | 11.4 | 9.4 | 4.4 | 2.4 | 0 |
| Enthalpy of Gas (BTU/lb-mol) | 4045 | 4046 | 4061 | 4071 | 4095 | 4104 | 4119 |
| Enthalpy of Liquid (BTU/lb-mol) | −230 | −217 | −203 | −193 | −169 | −159 | −143 |
| ΔT across reaction zone (° C.) | 0 | 0 | 0 | 1.08 | 6.0 | 7.8 | 9.9 |
| % Reaction Heat Removed by Evaporation | 100 (Unstable) | 100 (Unstable) | 100 (Unstable) | 90.8 | 42.2 | 23 | 0 | measured ΔT fall between the calculated limits. Stable operation was achieved.

Reaction Conditions:
Overall Pressure: 295 psi
Overall Reactor Composition (mol %): $C_2H_4$=0.333, isopentane=0.093, $C_6H_{12}$=0.047, $C_6H_{14}$=0.009, $H_2$=0.06, $N_2$=0.458.
Heat of Polymerization=1600 BTU/lb
Production Rate=56,600 lb/hr
Cycle Stream Mass Flow Rate=2,410,000 lb/hr.
ΔT Across Reaction Zone=36° C.
Reactor Inlet Temperature=51° C.
Calculations:
Dew Point=75.7° C.
Calculated Liquid Wt. % at Reactor Inlet=18.8
Calculated ΔT across reaction zone=35.3° C.
$\Delta T_{max}$. Across Reaction Zone (i.e., no evaporation)≅48.2° C.
Maximum Wt. % Liquid at Reactor Inlet (i.e., 100% Reaction Heat Removed by Vaporization)=46.4

Example 4

Polypropylene Production

Example 4 is a simulation of commercial polypropylene production. This example shows how ΔT across the reaction zone can be used to control liquid evaporation. It also shows how the criteria of the invention can be used to discern unstable conditions. It further shows the enhanced sensitivity of the reaction zone ΔT control method over inlet temperature control. The stable control range for inlet temperature is ≅1° C. vs. 9° C. for the ΔT control method.

Overall Pressure: 420 psig
Overall Reactor Composition (mol %): $C_3H_6$=0.9, $H_2$=0.0025, $N_2$=0.0975.
Calculated Dew Point=59.7° C.
Heat of Polymerization=1050 BTU/lb
Production Rate=20,000 lb/hr
Cycle Stream Mass Flow Rate=1,975,000 lb/hr.
Average Gas Heat Capacity≅1.07 BTU/lb-°C.
Average Liquid Heat of Vaporization≅102 BTU/lb.
$\Delta T_{max}$. Across Reaction Zone (i.e., no evaporation)≅9.9° C.
Maximum Wt. % Liquid at Reactor Inlet (i.e., 100% Reaction Heat Removed by Vaporization)=10.4

Example 5

Polypropylene Production

Example 5 is a simulation of commercial polypropylene production. This example shows the addition/deletion of liquid propylene feed (i.e., propylene concentration) can be used to control ΔT across the reaction zone.

Overall Pressure: 420 psig
Overall Reactor Composition (mol %): $C_3H_6$=0.9–0.91, $H_2$=0.0025, $N_2$=0.0975–0.0875.
Heat of Polymerization=1050 BTU/lb
Production Rate=20,000 lb/hr
Cycle Stream Mass Flow Rate=1,975,000 lb/hr.
Average Gas Heat Capacity≅1.07 BTU/lb-°C.
Average Liquid Heat of Vaporization≅102 BTU/lb.
$\Delta T_{max}$. Across Reaction Zone (i.e., no evaporation)≅9.9° C.
Maximum Wt. % Liquid at Reactor Inlet (i.e., 100% Reaction Heat Removed by Vaporization)=10.4

| Propylene Mole Fraction | 0.9 | 0.9025 | 0.905 | 0.9075 | 0.91 |
|---|---|---|---|---|---|
| $N_2$ Mole Fraction | 0.0975 | 0.095 | 0.0925 | 0.09 | 0.0875 |
| Inlet Temp. (° C.) | 59.7 | 59.7 | 59.7 | 59.7 | 59.7 |
| Dew Point (° C.) | 59.7 | 59.9 | 60.1 | 60.4 | 60.6 |
| Wt. % Liquid | 2.4 | 4.6 | 6.8 | 9.2 | 11.7 |
| ΔT across reaction zone (° C.) | 7.8 | 5.8 | 3.7 | 1.3 | 0 |
| % Reaction Heat Removed by Evaporation | 23 | 44.1 | 65.2 | 88.3 | 100 (unstable) |

Example 6

Actual Polypropylene Production with Condensing/Evaporation

Example 6 shows actual polypropylene production data in condensing mode operation. This example shows that the more complex thermodynamic calculations at the reactor inlet conditions (examples 4 and 5) do not agree with observed reactor behavior. Actual run data using the present invention would indicate 90.5% of reaction heat removed by vaporization while the more complex thermodynamic simulation shows only 31.8% of reaction heat removed by vaporization, underestimating the $\Delta T$ method by a considerable margin.

In this case, though both methods use a thermodynamic simulation to predict the extent of condensing, a direct measurement of evaporation in the reaction zone via $\Delta T$ would be preferred since it is inherently more stable and does not rely on any calculations to be used by the control method. Assuming that the $\Delta T$ method more accurately predicts condensing (a good assumption for PP production due to its higher sensitivity as shown in example 5), this example also shows that an unstable operating condition could be avoided using the present invention as compared to conventional condensing mode calculations.

Reaction Conditions:
Overall Pressure: 520 psig
Overall Reactor Composition (mol %): $C_3H_6$=0.79, $C_3H_8$=0.045, $H_2$=0.025, $N_2$=0.14.
Heat of Polymerization=1050 BTU/lb
Production Rate=36,400 lb/hr
Cycle Stream Mass Flow Rate=2,650,000 lb/hr.
$\Delta T$ Across Reaction Zone=1.5° C. (90.5% of reaction heat removed by vaporization)
Reactor Inlet Temperature=63.5° C.
Calculations:
Dew Point=63.7° C.
Calculated Liquid Wt. % at Reactor Inlet=4.5
Calculated $\Delta T$ across reaction zone=9.6° C. (31.8% of reaction heat removed by vaporization) using reactor inlet composition, temperature, pressure.
$\Delta T_{max}$. Across Reaction Zone (i.e., no evaporation)$\cong$13.5° C.
Maximum Wt. % Liquid at Reactor Inlet (i.e., 100% reaction heat removed by Vaporization)=14.1

Example 7

Actual Polypropylene Production with Condensing/Evaporation

Example 7 shows actual polypropylene production data in condensing mode operation. This example again shows that conventional condensing calculations (examples 4 and 5) do not agree with observed reactor behavior. Actual run data indicate 68% of reaction heat removed by vaporization while thermodynamic simulation estimates show only 23.1% of reaction heat removed by vaporization. As in Example 6, a direct measurement of evaporation in the reaction zone via $\Delta T$ gives better reaction control.

Reaction Conditions:
Overall Pressure: 435.5 psig
Overall Reactor Composition (mol %): $C_3H_6$=0.843, $C_3H_8$=0.0518, $H_2$=0.00201, $N_2$=0.104.
Heat of Polymerization=1050 BTU/lb
Production Rate=43,500 lb/hr
Cycle Stream Mass Flow Rate=2,030,000 lb/hr.
$\Delta T$ Across Reaction Zone=7.8° C. (68% of reaction heat removed by vaporization)
Reactor Inlet Temperature=61.1° C.
Calculations:
Dew Point=61.4° C.
Calculated Liquid Wt. % at Reactor Inlet=5.1
Calculated $\Delta T$ across reaction zone=17.0° C. (23.1% of reaction heat removed by vaporization) using reactor inlet composition, temperature, pressure.
$\Delta T_{max}$. Across Reaction Zone (i.e., no evaporation)$\cong$21.0° C.
Maximum Wt. % Liquid at Reactor Inlet (i.e., 100% reaction heat removed by Vaporization)=22.1

What is claimed is:

1. A process for controlling a continuous gas phase exothermic process in a reactor having (1) a reactor inlet;

(2) a reactor bed;

(3) a reactor outlet; and (4) a recycle line with (a) a compressor and (b) a heat exchanger;

with a pre-selected temperature for the reactor bed or outlet (2 or 3) and with a temperature differential ($\Delta T$) between the temperature of the reactor inlet (1) and the pre-selected temperature of the reactor bed or outlet (2 or 3), comprising:

(A) controlling the heat transfer provided by the heat exchanger (4(b)) to maintain the pre-selected reactor bed (2) or outlet (3) temperature, while simultaneously (B) controlling the feed rate to the reactor of a condensable fluid to maintain the temperature differential ($\Delta T$) constant.

2. A process according to claim 1 wherein $\Delta T$ is controlled via the following relation:

$$\Delta T = \frac{(P.R.)(\Delta H_r) - (\dot{m})(x_1)(\Delta H_v)}{(\dot{m})(1-x_1)(C_p)_{cyclegas}}$$

where (P.R.)=production rate, ($\Delta H_r$)=heat of reaction, ($\dot{m}$)=cycle gas stream mass flow rate; ($x_l$)=mass fraction of liquid in the cycle gas stream at reactor inlet, ($\Delta H_v$)=heat of vaporization, and $(C_p)_{cyclegas}$=heat capacity of the cycle gas.

3. A process according to claim 2 wherein the process control follows the following limitations:

$$(P.R.)(\Delta H_r) \geq (\dot{m})(x_1)(\Delta H_v); \quad (1)$$

$$\Delta T \leq \frac{(P.R)(\Delta H_r)}{(\dot{m})(C_p)_{cyclegas}}; \text{ and} \quad (2)$$

$$\frac{\partial (P.R.)}{\partial [\dot{m}(x_1)]}\bigg|_{\substack{Catalyst\ Feed,\\ Other\ Independant\\ Variables\ Constant}} \geq 0. \quad (3)$$

4. A process according to claim 3 where the exothermic process is a polymerization reaction to manufacture polypropylene homopolymers or copolymers, ethylene-propylene rubber, ethylene-propylene-diene rubber or polyethylene homopolymers or copolymers.

5. A process according to claim 4 wherein the condensable fluid is a reactant.

6. A process according to claim 4 wherein the reactant feed comprises a condensable fluid and a reactant.

7. A process according to claim 4 wherein the condensable fluid is selected from the group consisting of propane, n-butane, isobutane, n-pentane, isopentane, neopentane, n-hexane, isohexane, n-heptane, n-octane, other saturated $C_7$ and $C_8$ hydrocarbons, propylene, 1-butene, isobutene, hexene, hexadiene, isoprene, styrene, octadiene, ethylidene norborene, butadiene and mixtures thereof.

8. A process according to claim 1, wherein there are thermocouples measuring the reactor inlet, bed, and outlet temperatures and the selected temperature differential ($\Delta T$) is determined from these thermocouples.

9. A process according to claim 8 wherein the measured temperature differential ($\Delta T$) is linked operationally to the amount of condensable fluid entering the reactor via a reactor feed line.

10. A process according to claim 8 wherein the measured temperature differential $\Delta T$ is operationally linked to the amount of heat transfer provided by the heat exchanger and to the mass flow through the recycle line.

* * * * *